US012774763B2

(12) United States Patent
Draht et al.

(10) Patent No.: US 12,774,763 B2
(45) Date of Patent: Oct. 27, 2026

(54) FASTENING METHOD OF A CHANNEL AND A VERTICAL FASTENING WITH THREADED PIPE FOR SAME

(71) Applicant: BOLLHOFF VERBINDUNGSTECHNIK GmbH, Bielefeld (DE)

(72) Inventors: Torsten Draht, Schloß Holte-Stukenbrock (DE); Jörg Moehring, Paderborn (DE)

(73) Assignee: Böllhoff Verbindungstechnik GmbH, Bielefeld (DE)

( * ) Notice: Subject to any disclaimer, the term of this patent is extended or adjusted under 35 U.S.C. 154(b) by 0 days.

(21) Appl. No.: 18/391,896

(22) Filed: Dec. 21, 2023

(65) Prior Publication Data

US 2024/0209963 A1 Jun. 27, 2024

(30) Foreign Application Priority Data

Dec. 23, 2022 (EP) .................................... 22216334

(51) Int. Cl.
*F16L 3/133* (2006.01)

(52) U.S. Cl.
CPC .................................... *F16L 3/133* (2013.01)

(58) Field of Classification Search
CPC ... F16L 3/133; F16L 3/006; F16L 3/11; F16L 3/237; F16L 55/035; F24F 13/0254; F16B 7/06; H02G 3/263; H02G 3/34
USPC ...................................................... 403/43, 46
See application file for complete search history.

(56) References Cited

U.S. PATENT DOCUMENTS 1,480,253 A 1/1924 Fisher
1,514,455 A * 11/1924 Gordon .................. F16L 3/133 248/62
3,480,060 A * 11/1969 Sheldon .................. F16B 39/38 411/262
3,506,227 A * 4/1970 Jenkins ..................... F16L 3/11 248/70
4,294,054 A 10/1981 Kuhr
4,667,916 A * 5/1987 Richards ................ F16B 9/054 403/372

(Continued)

FOREIGN PATENT DOCUMENTS

DE 1895297 U 6/1964
EP 3981950 A1 4/2022

(Continued)

*Primary Examiner* — Kimberly T Wood
(74) *Attorney, Agent, or Firm* — Reising Ethington P.C.

(57) ABSTRACT

A fastening method of a channel with a vertical fastening, having a vertical anchor, a threaded pipe with a first and a second inner thread adjacent to a first and a second pipe opening, the first inner thread of which fits on a threaded connector of the vertical anchor and the inner threads arranged at a distance to each other. The vertical fastening also has a retaining bolt with a free thread end which fits into the second inner thread and a head end connectable or connected with a holding construction of the channel. The method includes fastening the top vertical anchor with the fastening end in a supporting horizontal construction, connecting the threaded connector with the first inner thread, screwing-in the free thread end into the second inner thread so that the holding construction of the channel is connected with the vertical anchor by the threaded pipe.

4 Claims, 11 Drawing Sheets

(56) References Cited

U.S. PATENT DOCUMENTS

| | | | | | |
|---|---|---|---|---|---|
| 4,691,889 | A * | 9/1987 | Richards | F16B 9/056 | 411/33 |
| 4,890,954 | A * | 1/1990 | Richards | F21V 21/03 | 403/372 |
| 5,080,313 | A * | 1/1992 | Byrum | F21V 21/02 | 248/188 |
| 7,552,913 | B1 * | 6/2009 | Amoss | F16G 11/12 | 403/44 |
| 9,222,603 | B2 * | 12/2015 | Rego | F16L 3/1211 | |
| 2003/0213199 | A1 | 11/2003 | Bongio et al. | | |
| 2004/0195479 | A1 * | 10/2004 | Gulley | F16B 2/12 | 248/228.1 |
| 2005/0258316 | A1 * | 11/2005 | Lin | F21S 6/002 | 248/127 |
| 2014/0023453 | A1 * | 1/2014 | Hollensen | F16B 37/12 | 411/178 |
| 2019/0177976 | A1 * | 6/2019 | Wakiyama | B21H 3/02 | |
| 2020/0386250 | A1 * | 12/2020 | Berman | A47B 96/00 | |

FOREIGN PATENT DOCUMENTS

| | | | |
|---|---|---|---|
| JP | H09242828 | A | 9/1997 |
| KR | 2020090002746 | U | 3/2009 |
| KR | 2020130000008 | U | 1/2013 |
| KR | 2020190002995 | U | 12/2019 |

* cited by examiner

FASTENING METHOD OF A CHANNEL AND A VERTICAL FASTENING WITH THREADED PIPE FOR SAME

CROSS REFERENCE TO RELATED APPLICATIONS

This application claims the priority to EP Patent Application No. EP22216334.7 filed on Dec. 23, 2022, and the entire content of this priority application is incorporated herein by reference in its entirety.

TECHNICAL FIELD

The present disclosure is related to a fastening method of a channel for guiding a medium or conduits with the help of an adaptable vertical fastening. Furthermore, the present disclosure is related to a vertical fastening, to the one-sided and double-sided threaded pipes used in this context as well as to manufacturing methods for same.

BACKGROUND

Buildings of different size and function are equipped with ventilation systems. They comprise, among others, branched channels in order to move or circulate, respectively, air masses or other media in the building. These channels are typically fastened below the ceiling of rooms or to horizontally extending beam constructions or ceiling and roof constructions.

Today's fastenings of such channels to a ceiling are typically carried out by means of threaded rods, which in case of larger air channels are connected in pairs at their lower end by means of a supporting traverse with one another. Due to this traverse, a kind of a U-shaped "bird cage" is produced, on which a channel or a channel segment lies.

The assembly of this channel fixture is laborious. The threaded rods are shortened to a suitable length at the place of installation. Most of the time, the shortening damages the thread, so that the threaded rods must be post-processed. Subsequently, the installation of the "bird cage" takes place, with small parts, such as washers, nuts and threaded sleeves being installed, which in part must be screwed over the produced thread again. As initially, the threaded rods were cut with a reserve of length, the nuts and locking nuts must additionally be rotated manually on the threaded rod via the reserved length.

After the assembly of a channel section, same must be adapted in terms of height, which requires a time-consuming unlocking and manual displacing of the nuts and locking nuts. After that, another shortening of the threaded rod to the final length is carried out.

The above-described fastening system for such channels which are used for ventilation systems and the like is laborious regarding the necessary time for the installation. Furthermore, the used components, such as the threaded rods, have the disadvantage that they constitute a large, angled surface which collects dirt, dust and other impurities. In case the channels are, however, installed in hygienically sensitive areas, such crucial surface areas must be cleaned constantly or protected from contaminations. This means that there is an additional effort in the installation and/or material expenditure.

The above-described fastening system for channels is often also used for fastening or suspending intermediate ceilings. The intermediate spaces arising by that serve for receiving such channels, which may be arranged such that they are covered for aesthetic reasons. The fastening systems described in US 2003/0213199 A1 and U.S. Pat. No. 4,294,054 use exposed threaded rods having a contamination sensitive surface of disadvantageous size. Furthermore, in the installation of the fastening systems, it has shown disadvantageous to connect threaded rods running up to one another with a tension lock. Such a tension lock is characterized by two nut threads of contrary thread direction located opposite to each other, so that the threaded rods which are arranged in the nut threads are moved towards each other by the rotation in one direction and moved away from each other by the rotation in the other direction. In this way, the distance between a construction to be suspended and the top vertical anchor or a ceiling fixture can be adjusted. Such tension locks are adjustable only manually, so that a correspondingly great effort in time is necessary as long as longer thread ways are to be covered or screwed.

The object of at least some implementations of the present disclosure is to provide a fastening method and a fastening system with which such channels can be installed in a more economical way.

SUMMARY

The above object is solved by a fastening method of a channel for guiding a medium or conduits with the help of an adaptable vertical fastening, a double-sided and a one-sided threaded pipe, a set of threaded pipes, a manufacturing method for the one-sided or the double-sided threaded pipe as well as a vertical fastening. Advantageous embodiments and further developments result from the following description, the drawings as well as the appending claims.

The fastening method of a channel for guiding a medium or conduits uses an adaptable vertical fastening. The vertical fastening includes at least: a vertical anchor with a fastening end and a threaded connector, which when viewed in vertical direction assumes a top position of the adaptable vertical fastening, a threaded pipe with a first and a second inner thread of the same direction, the threads being arranged opposite one another and adjacent to a first and a second pipe opening, the first inner thread of which fits on the threaded connector of the vertical anchor and the first and the second inner thread of which are arranged by means of a receiving space at a distance to each other, and a retaining bolt with a free thread end and a head end, the thread end of which fits into the second inner thread of the threaded pipe and the head end of which is connectable or connected with a holding construction of the channel. The fastening method includes the following steps: fastening the top vertical anchor with the fastening end in a supporting horizontal construction, which may be a ceiling or beam construction, connecting the threaded connector of the vertical anchor with the first inner thread of the threaded pipe, screwing-in the free thread end of the retaining bolt into the second inner thread of the threaded pipe so that the holding construction of the channel is connected with the vertical anchor by means of the threaded pipe.

The fastening method is directed to a simplified fastening of channels below a ceiling construction. Such channels for example belong to a ventilation system or an air conditioning system of a building or are used for guiding bundles of cables or the like. The typical ceiling of a room but also an at least horizontally extending beam or ceiling construction is considered to be a suitable ceiling construction, because this ceiling or beam construction provides a constructively vertical, high-arranged fastening point so that at this location, a fastening anchor for holding the channels may be arranged firmly.

As a fastening system, which will be described in more detail below, extends in a vertical downward direction in the ceiling construction or an equal beam construction and the anchor constitutes the vertically highest point in this fastening system, the fastening element of the fastening system which is arranged at the vertically highest point is called vertical anchor. A pop rivet having a projecting thread end and being driven into the ceiling or a heavy-duty anchor with a thread end fastened in the ceiling construction or a threaded rod fastened in the ceiling with a dowel end serve, for example, as a vertical anchor.

To simplify the fastening of the at least one channel, different thread elements of the same thread direction are interconnected in the fastening system. Accordingly, the vertical anchor includes a thread end with a first thread direction with which a first end of a threaded pipe is connectable with an inner thread of the same thread direction. According to one design, the threaded pipe furthermore includes a second thread end, the inner thread of which also has the thread direction of the first thread end. A retaining bolt is screwed into this second inner thread of the threaded pipe in order to obtain a supporting or carrying traverse, which may be a crossbeam, or else to obtain a pipe clamp for carrying a channel.

Hence, for connecting the compound of vertical anchor, threaded pipe and retaining bolt with each other in vertical direction, the worker only needs to rotate the elements to be connected into one rotation direction. That means that an element-specific selection of the suitable rotation direction is omitted so as to achieve a quick installation or a quick assembly of the fastening system.

Furthermore, the threaded pipe which may be used, ensures that contrary to a common thread rod, no contamination-prone surface areas of a thread in the surrounding of the channel are exposed and for example need to be cleaned regularly. Rather, the threaded pipe which may be used may guarantee that a smooth outer surface of the threaded pipe, formed by a lateral surface of the threaded pipe, may reduce a proneness to contamination compared to the otherwise typical thread rods. This effect may further be supported by choosing a suitable material of the threaded pipe, as for example stainless steel or the like.

The centrally arranged threaded pipe is furthermore characterized by a screw-in space which is arranged between the two openings of the threaded pipe. According to a further constructive design of the threaded pipe, the screw-in space is freely accessible for the thread elements which are connected with same through the first and the second opening of the threaded pipe. This free screw-in possibility of thread elements into the threaded pipe provides the possibility that a length of the threaded pipe in combination with screwed-in thread elements or further elements is freely adjustable. Furthermore, for this adjustment, solely the rotation in the only one thread direction of the threads or in the contrary locking direction is necessary.

According to a further design of the fastening method, the further step is intended: decreasing or increasing a vertical distance between the holding construction and the carrying horizontal construction by screwing-in or unscrewing the thread end of the retaining bolt and/or the threaded connector of the vertical anchor into or out from the receiving space of the threaded pipe.

For instance, should it be necessary to change an inclination of a channel compared to a ceiling construction or a beam construction extending vertically over same, the threaded pipe may be screwed further onto the threaded connector of the vertical anchor or the free thread end of the retaining bolt is screwed further into the threaded pipe or out from it. Consequently, the vertical distance between the vertical anchor arranged on top and the supportive structures of the fastening system, such as for example a traverse or a channel clamp, which are located further below the vertical anchor, changes. For this effective setting possibility, it is therefore not necessary to change a threaded pipe in terms of its length, as is usual in case of common systems when using thread rods.

The fastening method may be complemented with the following further steps: providing the threaded pipe as a pipe with an inner thread end and a free pipe end, cutting to length or shortening the threaded pipe at the free pipe end to a defined length and providing a second inner thread in the free pipe end opposite to the present inner thread end.

According to a further embodiment, the effectiveness of the fastening method may be improved by equipping the used threaded pipe with only one inner thread end first. On-site, it is possible to cut the free end of the threaded pipe, in which no inner thread or any other connecting possibly is arranged yet, to the suitable length. As soon as this cutting and thus adapting of the length of the threaded pipe to the constructional conditions has been made, a second inner thread is arranged in the free end of the threaded pipe abutting or adjacent to the second opening of the threaded pipe. This is for example carried out by means of a thread insert which is fastened in the second opening of the threaded pipe. Suitable fastening methods are for example gluing, welding or pressing-in. A blind rivet nut may be arranged in a clamping manner in the second end of the threaded pipe. Overall, the use of a threaded pipe with an end that is at first still free, provides the flexibility that in case of an unclear constructional situation or height situation below the vertical anchor, an adaption of the length of the threaded pipe to the fastening situation can be realized easily.

The fastening method may involve the further step: pressing-in a thread insert into the free pipe end or fastening a blind rivet nut in the free pipe end or cutting an inner thread and inserting a wire thread insert in there in the free pipe end or inserting a wire thread insert into a present inner thread.

As already indicated above, different construction possibilities may be utilized for realizing a second inner thread adjacent to the second opening of the threaded pipe. These alternative constructional approaches include the fastening of a blind rivet nut in the free end of the threaded pipe. A thread may directly be cut into the inner wall of the threaded pipe. In order to guarantee that a male thread element can be screwed into the screw-in space, the cut thread is additionally reinforced with a wire thread insert and reduced in terms of its nominal diameter. This may guarantee that the installation space has a larger inner diameter than the outer diameter of a male thread element which is screwed into the second opening with inner thread and wire thread insert. With a further alternative, a wire thread insert may be pressed into the second pipe end of the threaded pipe, is welded in there, is glued in there or is firmly arranged there in any other way.

In the fastening method, the vertical anchor may be configured according to the following constructive alternatives: it is a hanger bolt which is screwed into the horizontal construction, or it is a pop rivet which is included into the horizontal construction, or it is a heavy-duty anchor which is fastened in the horizontal construction, or it is a threaded rod, having a dowel end, the rod being screwed into the horizontal construction.

As already mentioned above, the vertical anchor forms the fastening element with respect to the overall fastening system which, when seen in vertical direction, is arranged at the highest position of the fastening system. In colloquial terms, the vertical anchor constitutes a fastening element which is fastened in a ceiling construction of a room and/or a beam construction of a room, a building or a similar construction. The fastening system is then assembled in vertical downward direction from this vertical anchor.

According to the present disclosure, a hanger bolt may be suitable as a fastening element for the arrangement in a ceiling construction or in a horizontal beam construction, which, after being rotated into the horizontal construction provides a threaded connection. Alternatively to that, a pop rivet having a functional end is also used. Once the pop rivet has been included into the horizontal construction, i.e. a ceiling or beam construction of a room, the functional end projects beyond the ceiling. A thread end may be used as the functional end so as to screw the threaded pipe on it.

A further alternative of a vertical anchor may be a known conception of a heavy-duty anchor. This heavy-duty anchor is fastened in a suitable opening of the horizontal construction and also constitutes a thread end matching the inner thread of the threaded pipe adjacent to its first opening. A threaded rod with dowel end may be used as a vertical anchor. In this context, the dowel end is fastened in the horizontal construction so that a remaining thread end of the threaded rod projects beyond the horizontal construction. The threaded pipe is then screwed onto this threaded rod, so that a part of the threaded rod may project into the screw-in space of the thread pipe. Depending on the necessary vertical length of the fastening system, the threaded rod is screwed into or out from the screw-in space.

Furthermore, the present disclosure comprises a double-sided threaded pipe for the bilateral fastening of one bolt on each side, the bolt having an outer thread, wherein the pipe comprises the following features: a pipe with a first and a second opening opposite one another, a first inner thread which is arranged adjacent to the first opening and has a first thread direction, and a second inner thread which is arranged adjacent to the second opening and has a second thread direction, the first and second thread directions of which are the same, a screw-in space which is located between the first and the second inner thread and has a free inner diameter being larger than or the same as a larger nominal diameter of the first and second inner thread, the first and the second inner thread are a thread insert fastened adjacent to the first and/or second opening, or a blind rivet nut fastened adjacent to the first and/or second opening or an inner thread in the pipe, the thread being cut adjacent to the first and/or second opening, with a wire thread insert being arranged in there, or a combination of the above mentioned alternatives.

A central element of the fastening system, for example for ventilation channels or the like, is a double-sided threaded pipe. In this context, double-sided means that adjacent to the first opening and the second opening of the threaded pipe, there is an inner thread on the inside, into which a male thread element can be screwed. In order to configure the installation of the fastening system as easy as possible, the first and the second inner thread have the same thread direction. Consequently, the installation technician does not have to differentiate in which thread direction he/she must screw which element of the fastening system in order to be able to connect it with the threaded pipe. A further advantage is that the threaded pipe does not have to be installed in a specific orientation as both inner threads may fit on the vertical anchor or the retaining bolt.

Furthermore, the threaded pipe provides a closed element with a limited, exposed outer surface, because a closed outer side of the threaded pipe may contact the outer surrounding of the fastening system only, so that a possible contamination is limited to the size of the outer surface of the threaded pipe. As furthermore, the threaded pipe may include a smooth surface, only reduced contact points or engagement points for contamination are provided at the outer side of the threaded pipe.

Regarding the construction of the double-sided threaded pipe, the screw-in space may be limited in terms of its length by the adjacent inner threads adjoining the first and second opening of the threaded pipe. Furthermore, the size of the inner diameter of the screw-in space is selected of such size that it may be larger than or the same as the nominal diameter of the first and second inner thread of the threaded pipe. This guarantees that a male threaded element, which has been screwed into the first or the second inner thread, can be received in the screw-in space without more ado. Therefore, this screw-in space forms a protected receiving space for thread surfaces of a male thread element arranged in there, so that these thread surfaces are not subject to a contamination of the atmosphere in the surrounding of the fastening system.

As suitable inner threads adjacent to the first and second opening of the threaded pipe, the above-mentioned different constructive alternatives are conceivable. For example, an inner thread may be cut into the inside of the threaded pipe and a wire thread insert may be arranged in there. According to a further alternative, a wire thread insert which may be made of metal is pressed or glued or welded into the end of the threaded pipe. According to a further configuration of the double-sided threaded pipe, a blind rivet nut may be fastened in the threaded pipe as an inner thread.

According to a further embodiment of the double-sided threaded pipe, the first and/or the second thread comprise a thread lock, which may be a tapered turn in the wire thread insert or a pitch warpage in the thread insert or a securing adhesive.

In at least one of the two inner threads of the threaded pipe, a thread lock is provided. Such thread locks are known in the state of the art. For example, a wire thread insert uses at least one tapering turn in order to exacerbate the screwing-in of a male thread element. In a metallic thread insert, a thread warpage is used to realize an inhibiting moment when screwing in and/or screwing out the male thread element. A further alternative is to provide the thread with a securing adhesive which exacerbates the rotating-in starting at a specific screw-in depth of the male thread element.

This thread lock has the function of signalizing the installing worker a defined screwing-in depth of the male thread element. From this point in time, specific distances and lengths are for example defined in the vertically aligned fastening system and can be changed specifically by means of further rotations in one or the other direction.

According to a further embodiment, the double-sided threaded pipe may comprise a circumferential lateral surface that is completely closed radially outwardly and which encompasses the inner thread and the screw-in space.

According to a further embodiment, the double-sided threaded pipe may be formed by a completely closed, circumferential lateral surface. This circumferential lateral surface forms a complete closure with respect to the radial inner space of the double-sided threaded pipe, so that the screw-in space is largely closed to the outside when two installed male thread elements are present. In this way, a pollution of the thread lengths and thread surfaces, respectively, of the male thread elements which are present in the screw-in space is avoided. Furthermore, according to a further configuration, the circumferential lateral surface may guarantee a simplified cleaning possibility of the double-sided threaded pipe in comparison with a structured surface of a thread rod.

According to a further embodiment, the double-sided threaded pipe may have a round or polygonal circumferential design.

According to a further design, the circumferential contour of the double-sided threaded pipe may be configured round or polygonal. A polygonal form is for example formed by a hexagon or a square. This angular design may provide the possibility of holding the threaded pipe with a tool, as for instance an open-end wrench. Apart from that, it is also possible to rotate the threaded pipe with this tool. Even if the outer surface of the threaded pipe increases compared to a round cross-section, this additional surface portion is still small compared to the contamination-prone big surface proportion of a thread rod.

On a radial inside, the screw-in space of the double-sided threaded pipe may be configured without thread, which may be completely plane and further continuous with a constant inner diameter.

According to a further configuration, the screw-in space may be configured smooth on its radial inside. Because even if a male thread element established a contact to the inside of the screw-in space when being screwed into the double-sided threaded pipe, a friction moment between the male thread element and the inside of the threaded pipe is maintained small in this way. Furthermore, an unstructured, smooth radial inner wall of the threaded pipe may allow a smaller design of the threaded pipe as regards its diameter than if a structure, for example a thread, was provided on the radial inside.

Furthermore, the present disclosure comprises a one-sided threaded pipe for the bilateral fastening of a bolt with outer thread or for the fastening of a bolt with outer thread and an element with inner thread, having the following features: a pipe with a first and a second opening opposite one another, a first inner thread being arranged adjacent to the first opening and having a first thread direction, a screw-in space being arranged between the first inner thread and the second opening and a free inner diameter greater than or the same as a nominal diameter of the first inner thread, the first inner thread is: i. a thread insert fastened adjacent to the first opening or ii. a blind rivet nut fastened adjacent to the first opening or iii. an inner thread, cut adjacent to the first opening, in the pipe with a wire thread insert arranged in it, wherein the threaded pipe is adapted adjacent to the second opening so as to provide a thread insert, a blind rivet nut or a thread in combination with a wire thread insert or to provide a rotatable or firmly arranged thread bolt for the fastening of an element with inner thread.

According to a further detail of the present disclosure, a one-sided threaded pipe is provided for the fastening system. In this context, one-sided means that the threaded pipe is pre-assembled with only one inner thread adjacent to the first opening of the threaded pipe. The second end of the threaded pipe does not include any thread structure. This allows that in advance of the installation of the fastening system, the threaded pipe is cut to a suitable construction length for the fastening system and can subsequently be equipped with a thread element adjacent to the second opening.

Thus, the one-sided threaded pipe provides a universal adaptability of the fastening system to different circumstances at an installation location. Furthermore, a pre-assembly of the threaded pipes to be used is not necessary in every case. Rather, due to a limited effort, the adaption of the length of the one-sided threaded pipe and the subsequent installation of the second thread element in the one-sided threaded pipe can take place in the course of the installation process of the fastening system directly.

That means that adjacent to its first opening, the one-sided threaded pipe is constructed in the same manner as the above-described double-sided threaded pipe. After generating the defined or required length of the one-sided threaded pipe, the second end of the threaded pipe is adapted such that adjacent to the second opening of the one-sided threaded pipe, a suitable thread element can be installed. Should an inner thread be necessary for the fastening system, an inner thread is cut and a wire thread insert installed in it adjacent to the second opening of the one-sided thread element. Alternatively, a metallic thread insert may be pressed into, glued into, welded into the second opening of the one-sided threaded pipe or fastened by another method in the one-sided threaded pipe. Alternatively, a blind rivet nut may be pressed into the second opening of the one-sided threaded pipe so that a male thread element may be screwed into same.

According to a further alternative of the one-sided threaded pipe, the second opening may be adapted so that a thread bolt can be fastened adjacent to the second opening and can project from same. The thread bolt which may project from the second opening is arranged firmly or rotatably. Such constructive alternatives can, for instance, be realized by means of a blind rivet bolt.

Within the threaded pipe, adjacent to the second opening of the one-sided threaded pipe, a radially inwardly projecting circumferential collar may be provided. The head of a male thread element rests against this radially inwardly projecting collar so that it is retained in a form-fit, though rotatable manner within the inner space of the thread. This rotatable thread element may include a drive means at its head in order to engage into this drive means with a suitable tool, for example an Allen wrench, and rotate same. For this purpose, the tool may reach through the first opening up to the rotatably arranged male thread element within the second opening. The constructive alternative in combination with the male thread element which is arranged with one side within the threaded pipe provides the possibility to connect this thread element with, for example, a pipe bracket for holding a round channel segment. Furthermore, it is possible to connect this male thread element to other retaining structures or screw it with same in case they provide a suitable and receiving nut thread.

According to a configuration of the one-sided threaded pipe, the first thread may include a thread lock, which may be a tapered turn in the wire thread insert or a pitch warpage in the thread insert or a securing glue.

According to a further configuration of the one-sided threaded pipe, a thread lock may be provided in the first thread of the threaded pipe. It uses the construction alternatives which were described above with regard to the double-sided threaded pipe.

According to a further embodiment, the one-sided threaded pipe may comprise a circumferential lateral surface that is completely closed on the radial outside and which encompasses the inner threads and the screw-in space.

Analogously to the double-sided threaded pipe, the one-sided threaded pipe may also comprise a circumferential lateral surface being completely closed on the radial outside. By that, after arranging the second thread element adjacent to the second opening of the one-sided threaded pipe, the same advantages are achieved which were already described above in combination with the double-sided threaded pipe.

According to a further embodiment, the one-sided threaded pipe may have a round or a polygonal circumferential design.

In addition, with regard to the design of the circumferential form of the one-sided threaded pipe, reference is made to the analogy to the double-sided threaded pipe. Accordingly, the above-described special characteristics and functions of the circumferential design of the double-sided threaded pipe may apply in the same manner to the circumferential design of the one-sided threaded pipe.

According to a likewise embodiment, the screw-in space of the one-sided threaded pipe may be threadless on a radial inside, which may be completely plane and further continuous with constant inner diameter.

The firmly arranged thread bolt in the second opening may be a blind rivet bolt or a fastened screw. Alternatively, the rotatably arranged thread bolt may be a screw with screw head which rests against a collar adjacent to the second opening, the collar projecting inwardly to the radial inside of a pipe.

The present disclosure also comprises a set of threaded pipes of the alternatives of the double-sided threaded pipe and the one-sided threaded pipe described in detail above. This set of a threaded pipe constitutes an advantageous preparation of the above-described installation method of the fastening system. Because for the installation of, for example, a channel segment under a horizontal construction, e.g. a ceiling or a beam construction, it may be necessary that a certain number of double-sided and/or one-sided threaded pipes are provided for the installation of the fastening system. Advantageously, the double-sided threaded pipes are contained in the set of threaded pipes with different lengths. Accordingly, they can be chosen by the worker and be installed depending on the application situation. A set of one-sided threaded pipes provides the possibility that the installer can cut the single one-sided threaded pipe to the suitable length and after that, installs the thread element adjacent to the second opening. By that, adapted threaded pipes for the respective installation situation can be provided with limited effort on site.

Furthermore, the present disclosure comprises a set of threaded pipes of different lengths according to one of the above-described configurations.

Furthermore, the present disclosure includes a manufacturing method of a one-sided or a double-sided threaded pipe according to one of the above-described configurations, having the following steps: a. providing a straight pipe with a first and a second opening and a defined length, b. fastening a thread insert adjacent to the first and/or second opening or c. cutting an inner thread into a pipe wall of the threaded pipe adjacent to the first and/or second opening and d. inserting a wire thread insert into the cut thread or inserting a wire thread insert adjacent to the first and/or second opening into an inner thread present in the threaded pipe or c. a combination of the steps b. to d. for generating different configurations adjacent to the first and the second opening.

The manufacturing method of the one-sided or the double-sided threaded pipe may furthermore be characterized in that the thread insert is pressed-in or glued-in or welded-in.

Furthermore, the present disclosure also includes a vertical fastening of a channel for guiding a medium or conduits having the following features: a vertical anchor with a threaded connector, a thread pipe according to one of the above configurations, a retaining bolt in combination with a retaining traverse as a resting surface for a channel or a retaining clamp for a round channel, wherein an outer thread of the retaining bolt is configured to match an inner thread of the threaded pipe, or a retaining clamp for a round channel with a nut thread which is configured to match an outer thread of a thread bolt in the second opening of the threaded pipe.

In order to implement the above-described fastening method in its most diverse configurations, the above-described vertical fastening may be used. The same consists of the different individual components, the different configurations of which have also been explained above. Accordingly, the vertical anchor, for example, forms the vertical top fastening point of the fastening system viewed in its vertically aligned configuration. The vertical anchor is for example a heavy-duty anchor or a hanger bolt or a pop rivet with threaded connector or a thread rod with dowel end or a holder of a trapezoidal sheet metal with threaded connector. These alternatives of the vertical anchor are each characterized in that they can be fastened in or to the horizontal construction, i.e. a ceiling or a beam construction and at the same time provide a threaded connector projecting from the horizontal construction. Because this threaded connector may be configured to match the inner thread of the one-sided or double-sided threaded pipe adjacent to its first opening. In this way, it is guaranteed that the vertical anchor and the one-sided or double-sided threaded pipe establish a reliable thread connection within the vertical fastening.

By means of the thread element at the second end of the threaded pipe, a resting surface or supporting element for a channel may be fastened to the threaded pipe with the help of a retaining bolt. Such a supporting element is, for example, a beam-like traverse but also a clamp with which a channel segment can be held. While the clamp may encompass a round-shaped channel and holds it in this way, the traverse may form a resting beam on which the channel lies due to the effect of gravity. Retaining clamp or traverse can be fastened in the second inner thread adjacent to the second opening of the threaded pipe by means of a suitable retaining bolt. With regard to the retaining clamp, a one-sided threaded pipe may be provided, having a male thread element which projects out from the second opening of the threaded pipe, in order to connect same with the supporting clamp.

In the vertical fastening, the vertical anchor may be a heavy-duty anchor or a hanger bolt or a pop rivet with threaded connector or a threaded rod with dowel end.

BRIEF DESCRIPTION OF THE DRAWINGS

In the following, the present disclosure will be described in detail based on the drawings. In the drawings, the same reference signs denote the same components and/or elements. They show.

DETAILED DESCRIPTION

Figure 1:
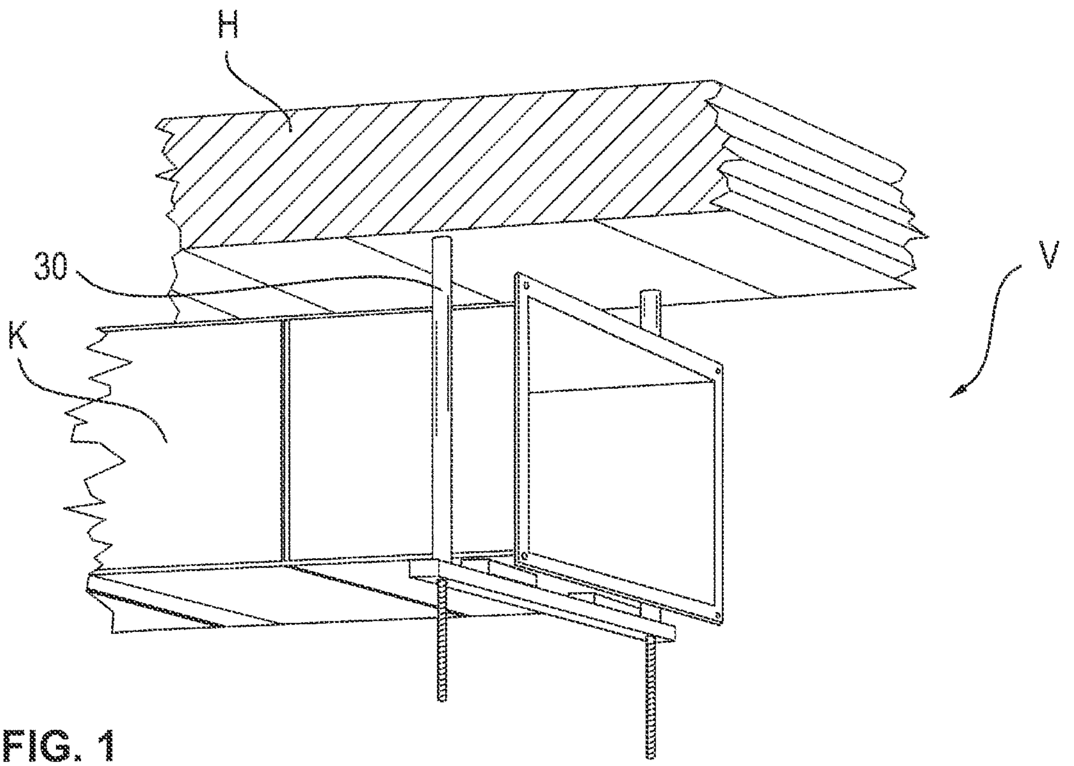
FIG. 1 a perspective view of an installation of a channel with the adaptable vertical fastening, FIG. 2 a schematic sectional view of an embodiment of the vertical fastening, FIG. 3 an embodiment of a two-level vertical fastening with two channels arranged vertically above one another, FIG. 4 a schematic sectional view of an embodiment of the vertical fastening in combination with a clamp for holding a round channel, FIG. 5 a perspective lateral view of the vertical fastening in combination with a round channel, FIG. 6 a schematic sectional view of a part of the vertical fastening with a traverse, FIG. 7 a further schematic sectional view of an embodiment of the vertical fastening with threaded pipe and traverse, FIG. 8 a further schematic sectional view of the vertical fastening in combination with a threaded rod with dowel end as vertical anchor and a traverse, FIG. 9 an enlarged schematic sectional view of an embodiment of a hanger bolt which is fastenable in a bore hole with dowel, FIG. 10 an illustration of the adjustability of different vertical distances of a channel or the traverse for the horizontal construction by means of the length adaption of the vertical fastening, FIGS. 11*a*, 11*b* and 11*c* embodiments of the one-sided threaded pipe and its adaptability, FIGS. 12*a*, 12*b*, 12*c*, 12*d*, 12*e*, 12*f*, 12*g* and 12*h* different configurations of the one-sided and the double-sided threaded pipe, FIG. 13 a flow chart of an embodiment of the fastening method, and FIG. 14 a flow chart of an embodiment of a manufacturing method of a one-sided or a double-sided threaded pipe.

The present disclosure includes a vertical fastening V for a channel or a channel segment K. A channel or channel segment K means an elongated cavity which is completely encompassed by a wall and perpendicular to the direction of extension. Such channels K and channel segments have a quadratic, round or polygonal cross-sectional form and are made of metal, which may be sheet metal, or plastic material.

Furthermore, such channels are used in ventilation systems, in combination with air conditioners for rooms and buildings or parts of buildings. As a further application case, the channels K serve for receiving and guiding cable harnesses or the like.

Such channels may be fastened below a ceiling of rooms, halls or the like or below a corresponding beam construction, when viewed in vertical direction. In this context, a beam construction which carries the vertical fastening, constitutes, beside a beam construction in a room, a building or a hall, any freestanding beam construction, e.g. in form of a gate or a T-construction. In summary, a ceiling or a carrying beam construction may be referred to as horizontal construction H, as it provides a vertically highest fastening point or a horizontally extending fastening surface for the vertical fastening V.

The term vertical fastening V furthermore may emphasize that from the horizontal construction H in gravity direction, i.e. in vertical downward direction, the system or the components of the vertical fastening V interact, which may be in a force fit and/or form fit manner, so as to hold a channel K or a channel segment at a defined vertical distance A vertically below the horizontal construction H.

For fastening and for holding the vertical fastening V at a horizontal construction H, a vertical anchor 10 is fastened in the horizontal construction H. For the fastening in the horizontal construction H, the vertical anchor 10 comprises a fastening end 12. In order to connect the vertical anchor 10 with a threaded pipe 30 of the vertical fastening V, the vertical anchor 10 includes a threaded connector 14 with an outer thread. Instead of the threaded connector 14, a locking connection may be provided in case the threaded pipe 30 provides a matching locking receiving device.

As the vertical anchor 10, all fastening elements may be used, which are fastenable in a force fit and/or form fit manner in the horizontal construction H and comprise a threaded connector 14 or a locking connection as a functional end. As a vertical anchor 10 in a supporting beam construction, support construction or ceiling construction H the following may be fastened (step S1): a) a pop rivet with a threaded connector which is included into the horizontal construction H, b) a hanger bolt with a screw-in thread for the horizontal construction H and the threaded connector for the threaded pipe 30, c) a heavy duty anchor which retains in a bore hole or opening of the horizontal construction H in a force fit and/or form fit manner and provides a threaded connector, or d) a threaded rod with dowel end, the dowel end of which is doweled in the horizontal construction H or is generally fastened and the threads of which serve for the connection with the threaded pipe 30.

Figure 2:
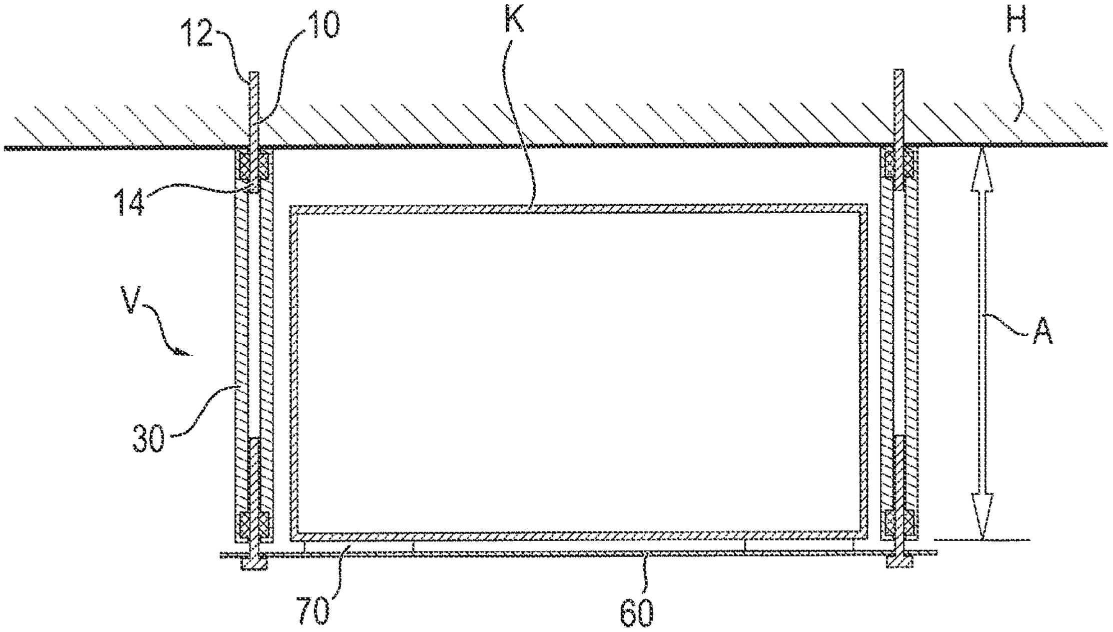
Figure 3:
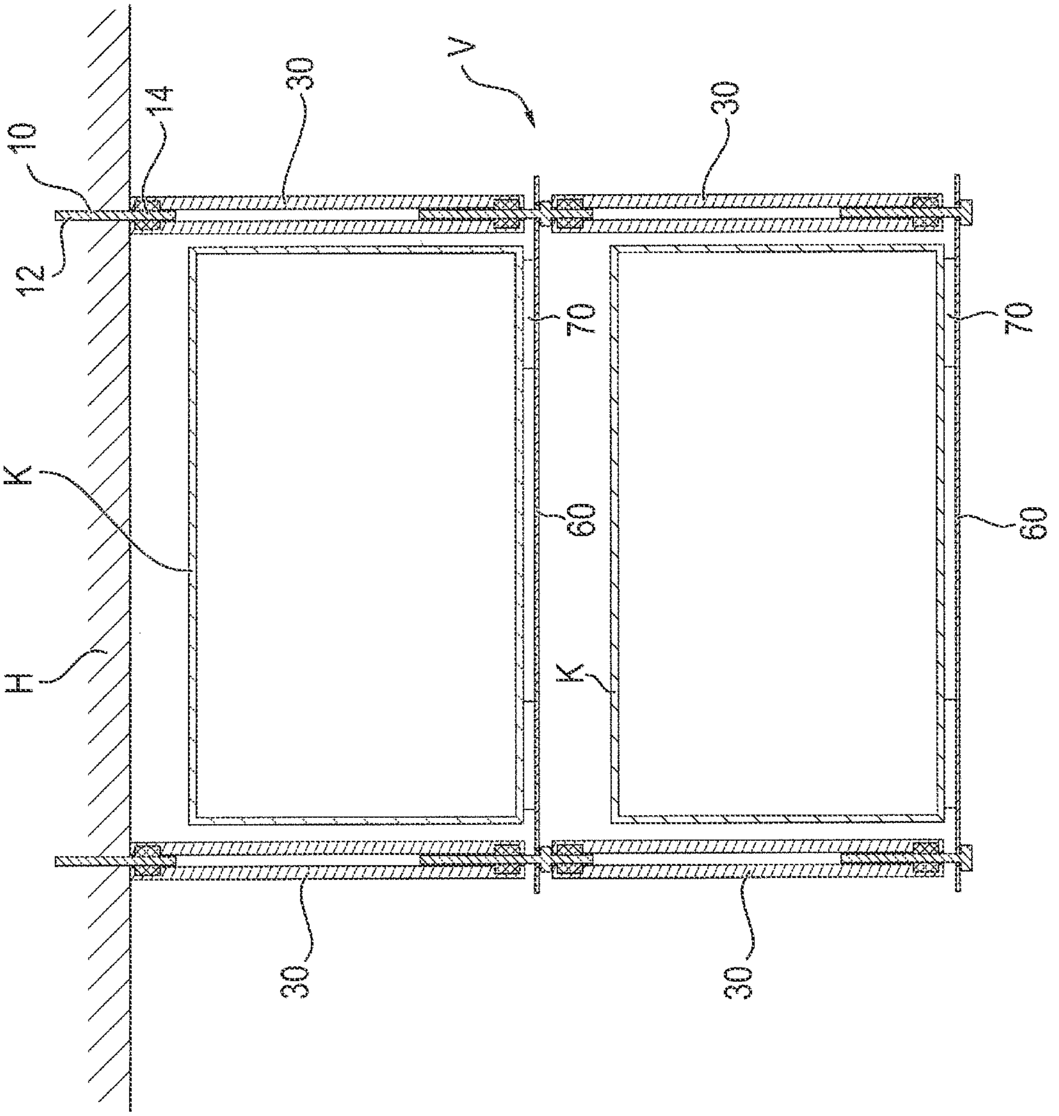
Figure 4:
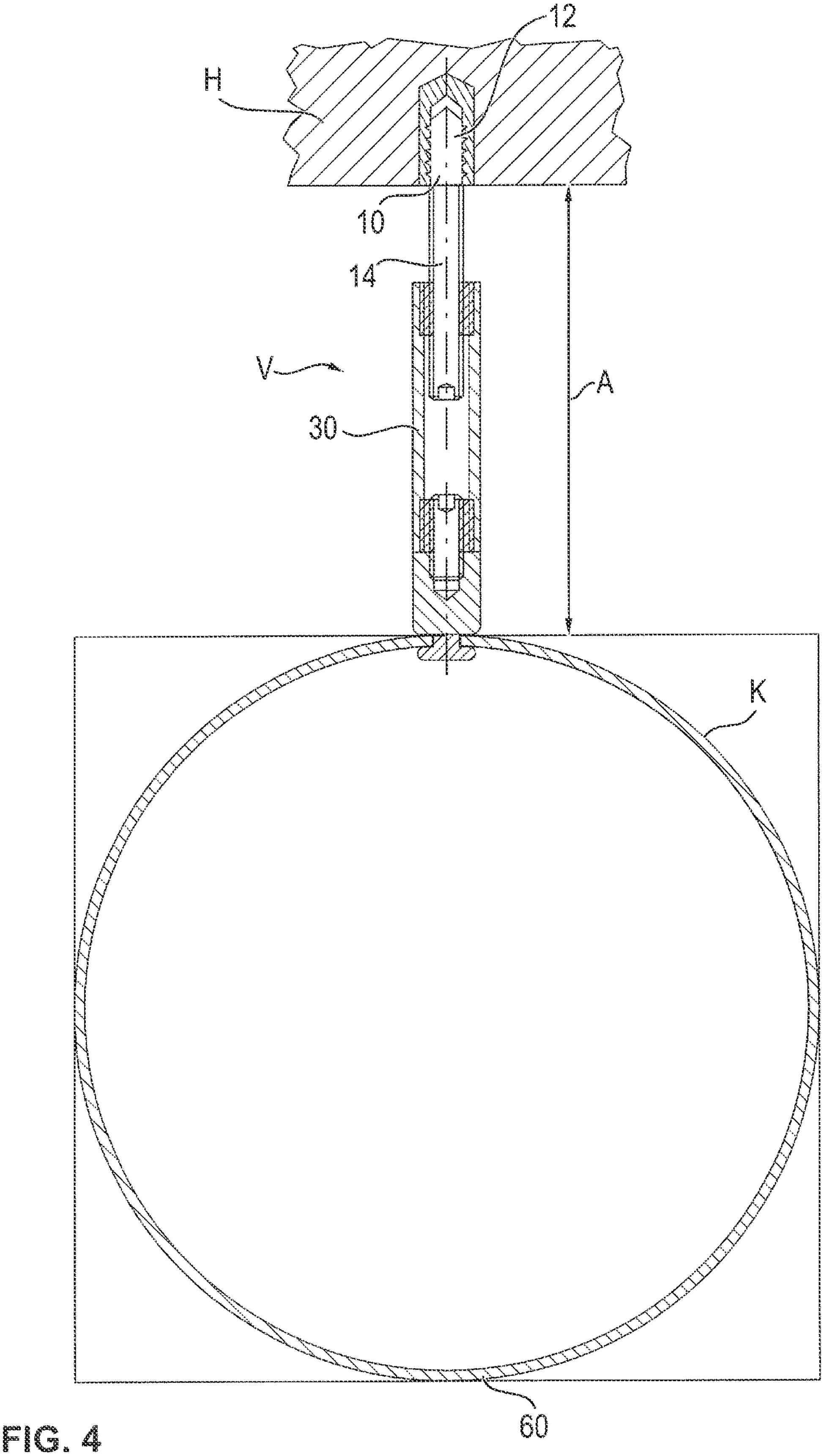
Figure 7:
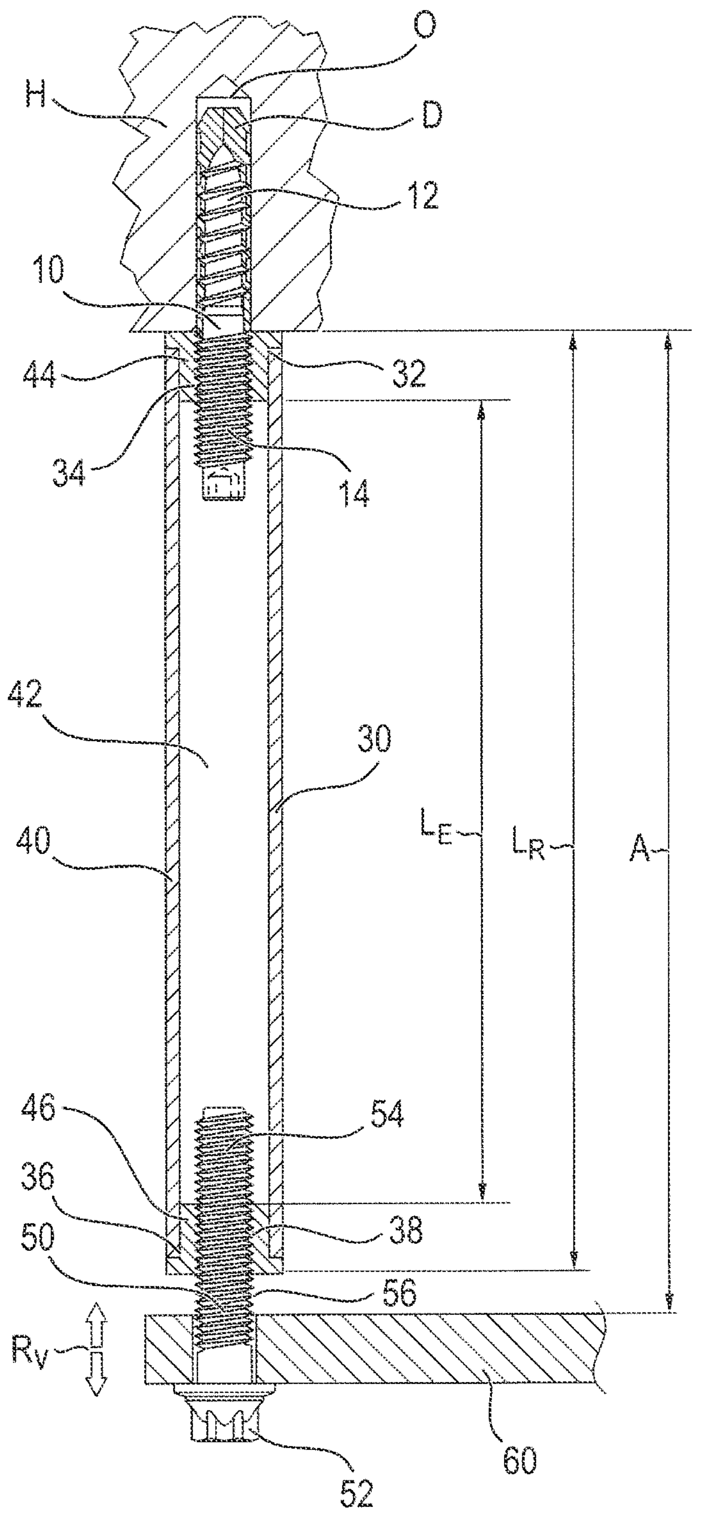
Figure 8:
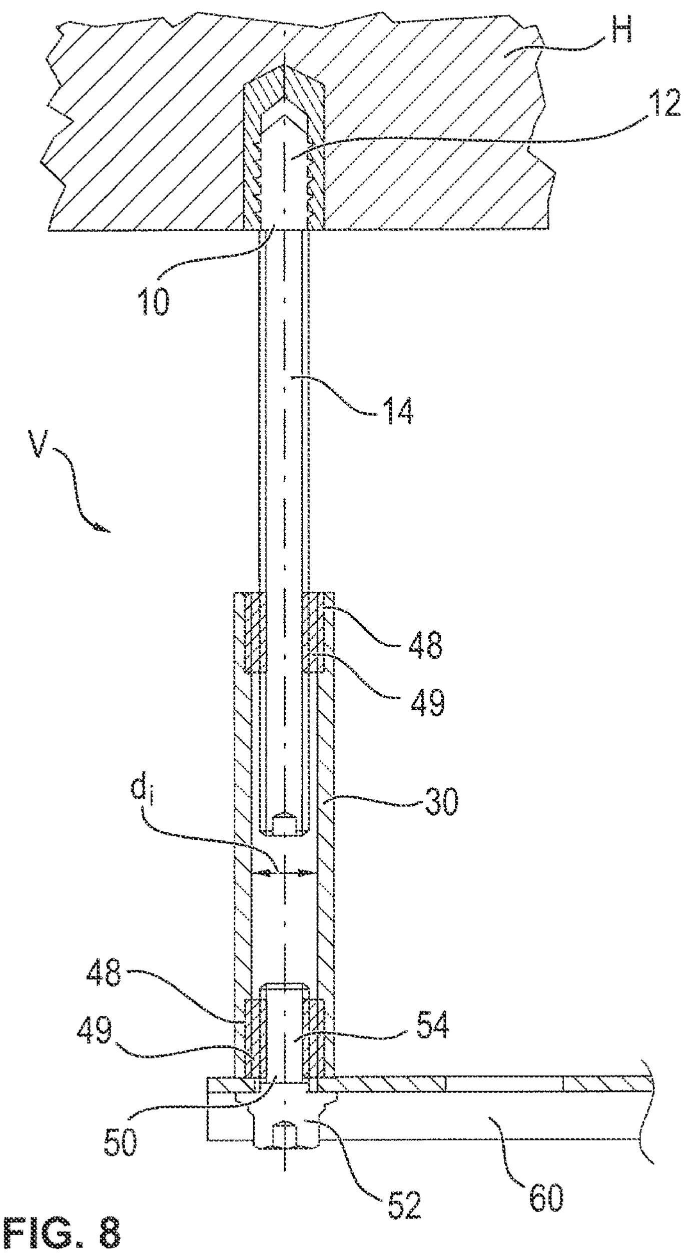
Figure 9:
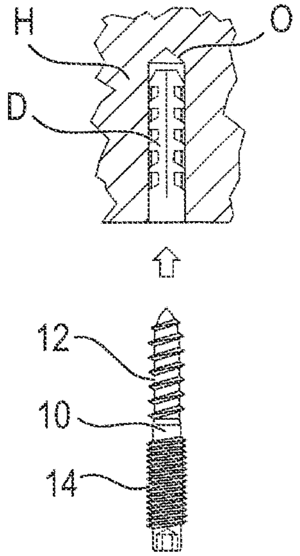

In FIGS. 2, 3, 4, 6, 7-9 and 10, the vertical anchor 10 is illustrated schematically. It is apparent that the vertical anchor 10, with respect to the vertical direction of the gravity effect, forms the vertically highest point of the vertical fastening V in the horizontal construction H. As a further configuration of the vertical anchor 10, FIG. 4 shows the threaded rod with dowel end. FIGS. 7 and 9 show a hanger bolt with threaded connector as the vertical anchor 10, while FIG. 8 shows a heavy-duty anchor in a schematically simplified manner.

Figure 10:
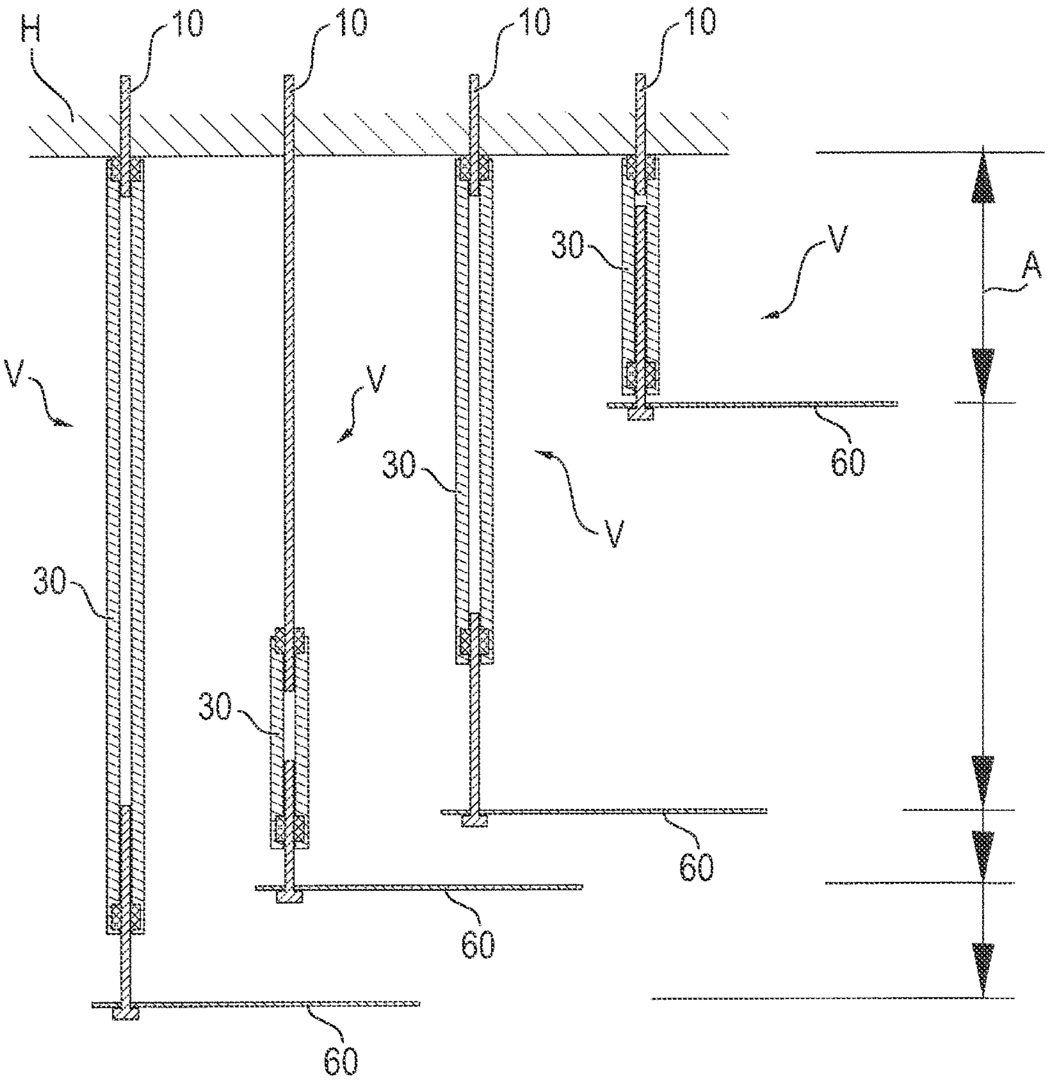
Figures 11A, 11B, 11C:
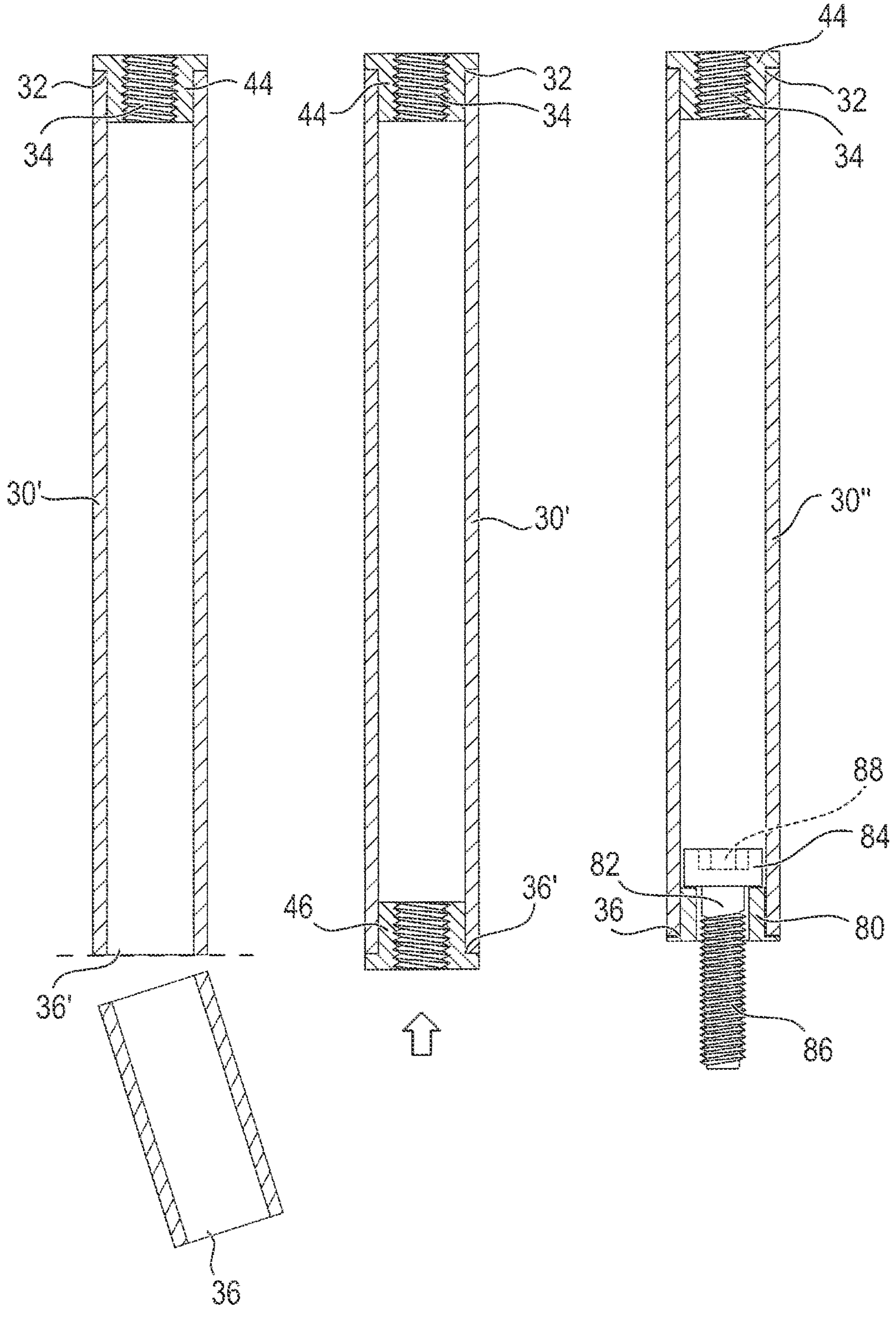

The threaded connector 14 of the vertical anchor 10 is connected with a threaded pipe 30 (step S2), as is shown in FIGS. 4, 6, 7, 8 but also in FIGS. 2, 3 and 10 according to different embodiments of the present disclosure.

The threaded pipe 30 has a first pipe opening 32 and a second pipe opening 36. Adjacent to the first pipe opening 32, a first inner thread 34 with a first thread direction is arranged. The first inner thread 34 is adapted to establish a threaded connection with the threaded connector 14 of the vertical anchor 10 (step S2).

A second inner thread 38 with a second thread direction is arranged adjacent to the second pipe opening 36. The second inner thread 38 is adapted to establish a matching threaded connection with an outer thread 52 of a retention bolt 50 (step S3).

The inner threads 34, 38 of the threaded pipe 30 have the same thread direction. The practical advantage of this is that when connecting the first inner thread 34 with the threaded connector 14 of the vertical anchor 10 and the second inner thread 38 with the retention bolt 50 (step S3) by the worker, no attention needs to be paid to different rotation directions during the assembly. Rather, the same rotation direction due to the same thread direction of both thread pairings is preferred and decisive.

The retention bolt 50 may include a head 52 and a shaft 54. An outer thread 56 is arranged on the shaft 54 so that a free thread end of the shaft 54 can be screwed into the second inner thread 38 adjacent to the second opening 36 or be screwed out of same. The shaft 54 may be arranged in an opening 62 of a holding construction 60, which may be a traverse, a beam, a holding strut, an intermediate floor. While the holding construction 60 may rest against the head 52 of the retaining bolt 50, the threaded connection between the outer thread 56 on the shaft 54 and the second inner thread 38 guarantees the connection between the vertical anchor 10 and the holding construction 60. As the channel K may rest on the holding construction 60, it is held by the vertical anchor 10 due to the above interaction.

In order to secure the rest of the channel K on the holding construction 60, which may be a traverse or a holding beam or an intermediate floor, an intermediate element 70 is provided (see FIGS. 2 and 3). According to different embodiments, this intermediate element 70 may be a damping element against vibrations of the channel K, a non-slip fastening element against possible movements of the channel K, a sound insulation for avoiding a sound propagation in the channel walls or a combination thereof.

FIG. 7 shows the embodiment of the vertical fastening V which has already been discussed above and which is fastened by means of the vertical anchor 10 in the horizontal construction H. In this embodiment, the vertical anchor 10 may be a hanger bolt. The fastening end 12 of the hanger bolt was screwed into a dowel D, which is arranged in a bore hole O of the horizontal construction H. A similar dowel end is also used in order to fasten a threaded rod with dowel end in the horizontal construction H.

Furthermore, the setting of the vertical distance A between the horizontal construction H and the holding construction 60 or traverse or channel K, respectively, is shown in FIG. 7. By means of an adjusting of a vertical extension or length of the vertical fastening V, the mentioned vertical distance A may be changed in a vertical direction Rv. The vertical distance A can be decreased or increased (step S4) by screwing the thread end or the threaded connector 14 further into the threaded pipe 30 or unscrewing it from same. The same goal is achieved by screwing the shaft 54 with outer thread 56 into the threaded pipe 30 or unscrewing it from same.

In this regard, FIG. 9 shows an enlarged illustration of the hanger bolt as vertical anchor 10, when being screwed into the dowel D in the bore hole O.

Different embodiments of the threaded pipe 30 are shown in FIGS. 4, 6, 7, 8, 11 and 12. The threaded pipe 30 comprises the first pipe opening 32 and the second pipe opening 36, which are located opposite one another. The first and the second inner threads 34, 38 are arranged adjacent to the first and second pipe opening 32, 36. The threaded pipe 30 may have a round circumferential form, as shown in FIGS. 12 *a-c*. A polygonal circumferential form may be a quadratic, hexagonal or octagonal circumferential form, as is shown in FIGS. 12*b, c*.

The threaded pipe 30 has a circumferentially encompassing lateral surface 40. The lateral surface 40 encloses the first and second inner thread 34, 38 as well as the male thread elements screwed into them, such as the threaded connector 14 and the shaft 54 with outer thread 56.

According to a further embodiment of the threaded pipe 30, the lateral surface 40 may be designed so that it is completely closed on the radial outside. In this way, the surface of the threaded elements 14, 34, 56, 38 are shielded from a contact to an atmosphere surrounding the vertical fastening V. Contaminations of the surface and the associated cleaning effort in hygienically sensitive areas, such as laboratories, kitchens or hospitals is thus reduced or avoided.

In this context, the outer lateral surface 40 may be designed smooth and with no structures. This will also reduce surface areas which are prone to pollution.

According to a further embodiment, the threaded pipe 30 may be made of stainless steel in order to reduce the risk of contaminations.

A screw-in space 42 may be provided between the first 34 and the second inner thread 38. The screw-in space 42 receives the portions of the male thread elements 14, 54 which have been screwed into the inner threads 34, 38.

The axial length L of the screw-in space 40 between the first 34 and the second inner thread 38 guarantees an adjustment way for the thread elements 14, 56 as the thread elements 14, 54 can be moved into or out from the screw-in space. In this way, a flexibility when adjusting the distance A and the vertical length of the vertical fastening V are provided.

Figure 12A:
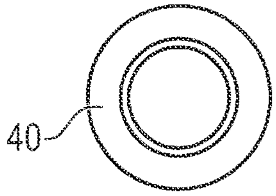
Figure 12C:
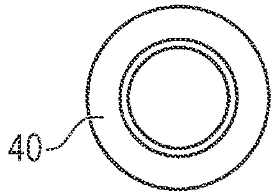
Figure 12B:
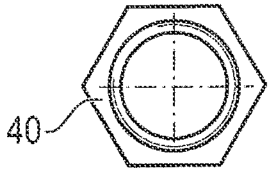
Figure 12D:
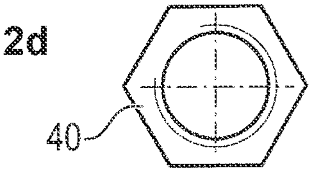
Figure 12E:
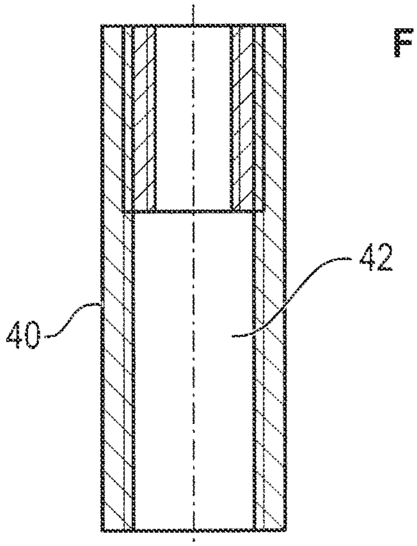
Figure 12G:
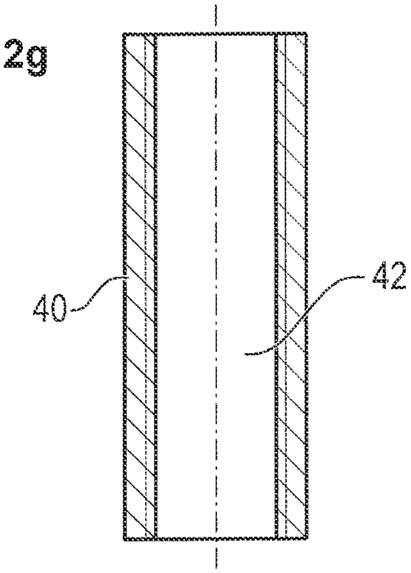
Figure 12F:
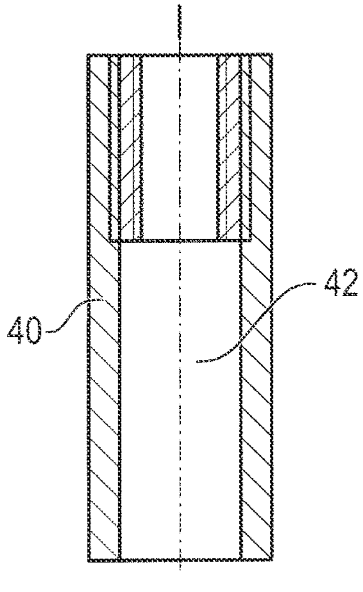
Figure 12H:
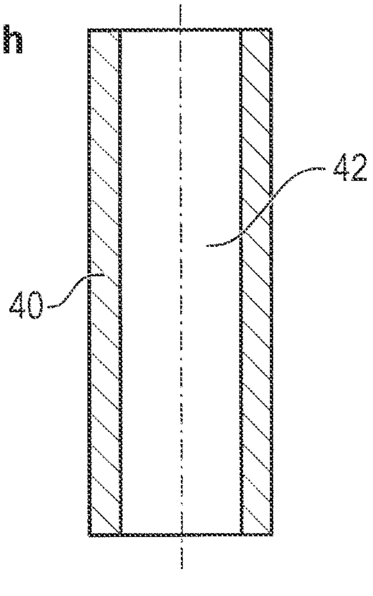

According to different embodiments, the screw-in space 42 has a thread (see FIGS. 12*e* and *g*) or is provided without an inner thread at the radial inside of the lateral surfaces 40 (see FIGS. 12*f* and *h*). The advantage of the embodiment without an inner thread is that the male thread elements 14, 56 can enter and exit the screw-in space 42 without any resistance.

The screw-in space 42 may have a constant inner diameter and a plane surface over its axial length. This will also allow a non-resistant screwing in and screwing out of the above-mentioned male thread elements.

In order to provide the threaded pipe 30, the first and the second inner threads 34, 38 are arranged adjacent to each of the first and second pipe opening 32, 36. For this purpose, a first 44 and a second thread insert 46 may be inserted into the first 32 and the second pipe opening 36. Alternatively to that, one blind rivet nut each may be arranged in the first and second pipe opening 32, 36 by means of pressing-in. The above-mentioned thread inserts 44, 46 are pressed-in, glued-in, welded-in or fastened by means of ultrasound in the known way.

As a further embodiment, a thread 48 may be cut on the radial inside of the threaded pipe 30 adjacent to the first 32 and the second pipe opening 36. After that, a wire thread insert 49 is dragged into the thread 48 or arranged in there. The wire thread insert 49 generates a thread with a nominal diameter $D_n$ which is smaller than an inner diameter $d_i$ of the screw-in space 42 of the threaded pipe 30.

In case of a constant inner diameter $d_i$ of the screw-in space 42, the wire thread insert with its nominal diameter $D_n$ may guarantee that the male thread elements 14, 56 can be screwed into the screw-in space 42 without any resistance. This context also applies to the application of wire thread inserts 44, 46 and blind rivet nuts. The maximum nominal diameter of the first and the second inner thread 34, 38 may be smaller than the constant inner diameter $d_i$ over the axial length of the screw-in space 42. Thus, the non-resistant screwing-in and screwing-out of the male thread elements 14, 56 into and out the screw-in space 42 when inserting the wire thread inserts, blind rivet nuts as well as cut threads with wire thread insert is guaranteed.

The above-mentioned thread elements may be combined with one another in a threaded pipe 30.

According to the present disclosure, the threaded pipe 30 which is equipped with two inner threads 34, 38 is referred to as double-sided threaded pipe 30. In order to have a highest possible flexibility regarding the adaptation of the fastening system V to the local and constructive special features of horizontal construction H and channels K during the installation of the vertical fastening system V, a set of double-sided threaded pipes 30 may be provided. The set of double-sided threaded pipes 30 may comprise a number of double-sided threaded pipes 30 of different lengths and/or different thread sizes.

According to a further embodiment of the fastening method, a one-sided threaded pipe 30' (see FIG. 13) may be provided. The one-sided threaded pipe 30' has the same constructive features as the above-described double-sided threaded pipe 30, with the difference that the second inner thread 38 adjacent to the second pipe opening 36 is not provided yet. Accordingly, the one-sided threaded pipe 30' has a free pipe end at the second pipe opening 36.

In the course of the installation of the fastening system V, it may be the one-sided threaded pipe 30' that is cut to length at its free end or shortened to the necessary length. By that, a new second pipe opening 36' is produced. Adjacent to the new second pipe opening 16', the second inner thread 38 is arranged according to the above-discussed construction alternatives (see FIG. 11*a, b*).

With respect to the one-sided threaded pipe 30', a set of one-sided threaded pipes 30' for the installation of the vertical fastening system V may be provided. The set of one-sided threaded pipes 30' includes a number of one-sided threaded pipes 30' of different lengths.

The one-sided 30' and the double-sided threaded pipe 30 may comprise a thread lock in the inner threads 34, 38. They include known configurations, such as a tapered turn in the wire thread insert, a pitch warpage in a wire thread insert or a blind rivet nut, or a securing glue is used in the thread.

According to different embodiments of the double-sided threaded pipe 30, 30', it has a total length $L_R$ in the range from 80 mm$\leq L_R \leq$2000 mm; which may be 160 mm$\leq L_R \leq$2000 mm.

The screw-in space 42 between the inner threads 34, 38 may have a length $L_E$ in the range from 40 mm$\leq L_E \leq$1980 mm; which may be 120 mm$\leq L_E \leq$1980 mm.

Furthermore, the following equation of the length $L_R$ of the threaded pipe 30 with respect to the maximum nominal diameter $D_n$ of the inner threads 34, 38 may apply to the double-sided threaded pipe 30: $8 \leq L_R/D_n \leq 250$, which may be $16 \leq L_R/D_n \leq 250$.

With respect to the length $L_E$ of the installation space 42, the following correspondingly applies: $4 \leq L_E/D_n \leq 248$; which may be $8 \leq L_E/D_n \leq 248$.

Figure 5:
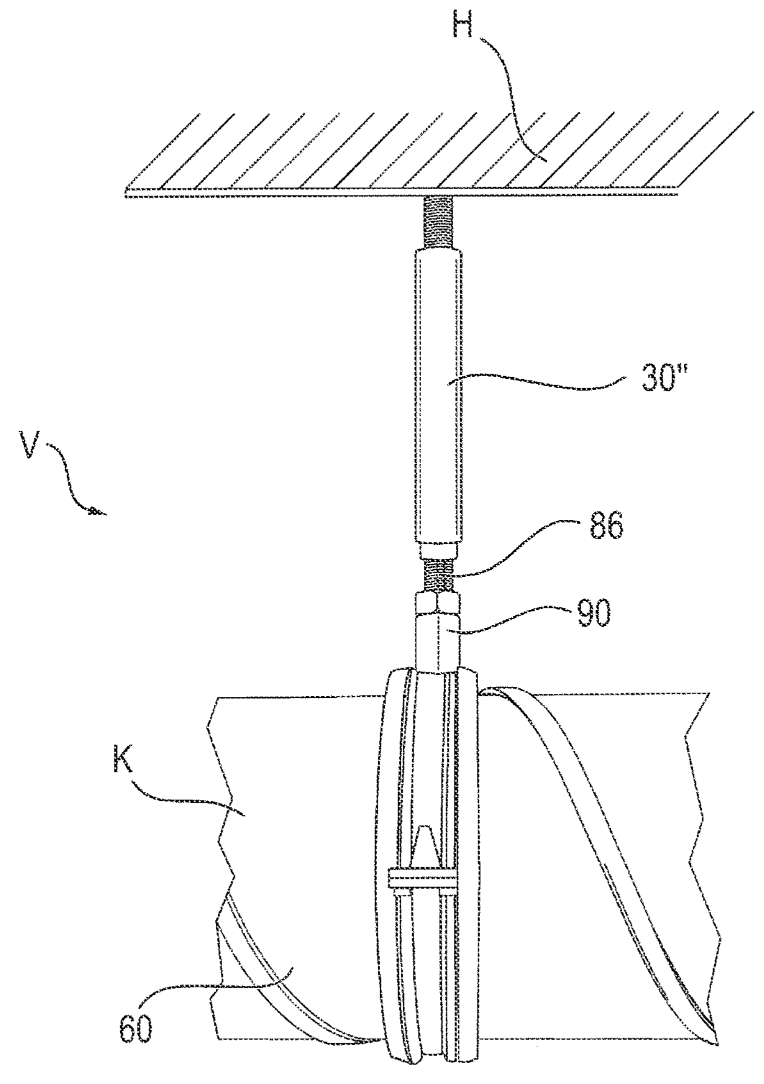
Figure 6:
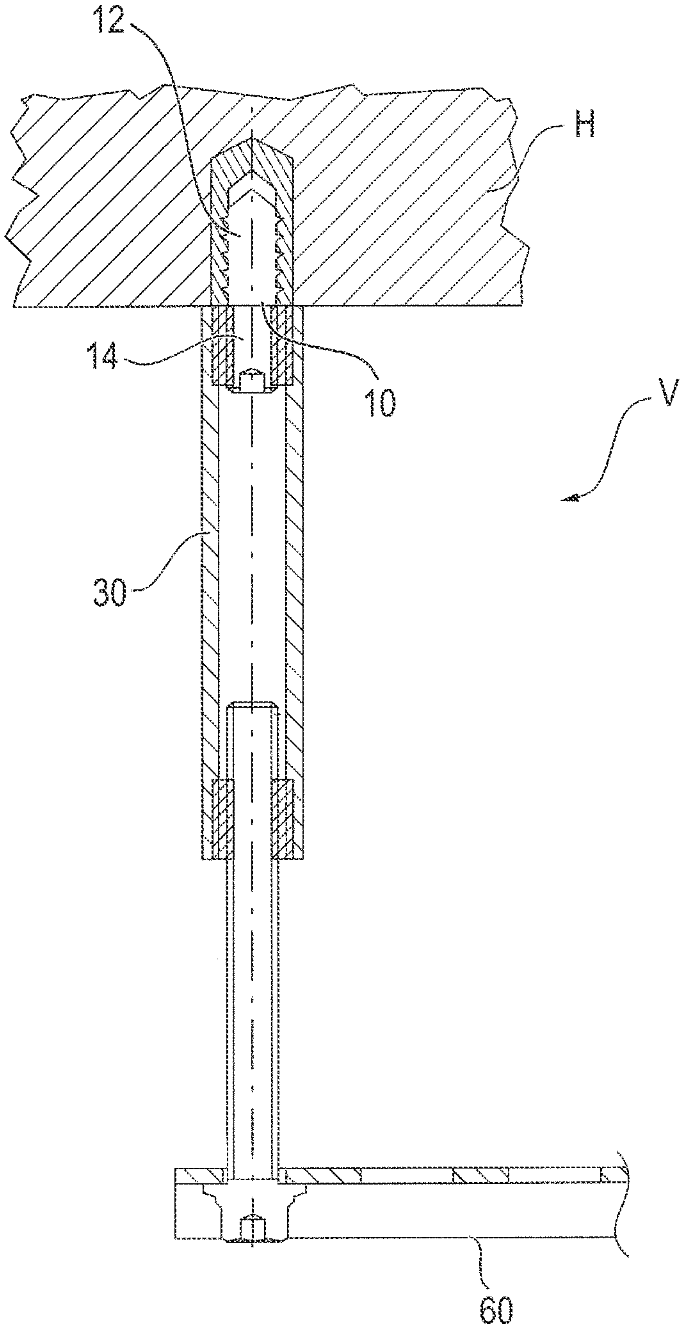
Figure 13:
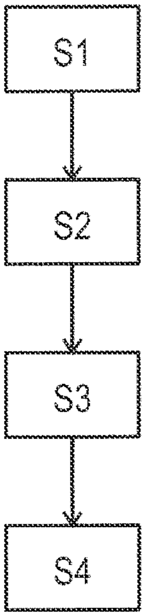
Figure 14:
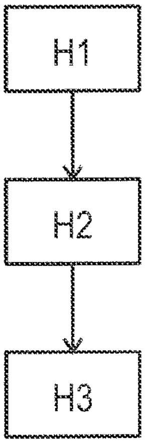

A further embodiment of the one-sided threaded pipe 30" is shown in FIG. 13 *c*. Adjacent to the second pipe opening 36, a radially inwardly projecting circumferential collar 80 is arranged inside the pipe. It defines a central opening, which is arranged coaxially with respect to the longitudinal axis of the threaded pipe 30". A threaded bolt 82 with a head 84 and a threaded shaft 86 is arranged inside the threaded pipe 30". While the head 84 rests on the collar 80 in a rotatable manner, the threaded shaft 86 extends through the central opening and projects through the second pipe opening 36 in order to establish a thread connection with a matching nut thread there. The head 84 may include a drive means 88 so that it can be rotated through the first pipe opening 32 with a tool. With the help of the arrangement according to FIG. 13*c*, a clamp as a holding construction 60 would be connectable with the threaded bolt 30" in which the threaded shaft 86 may be fastened in a receiving thread 90 in combination with the clamp, as shown by FIG. 5.

FIG. 10 also shows configurations of the vertical fastening system V, with which different vertical distances A between the horizontal construction H and the holding construction 60 may be realized.

The invention claimed is:

1. A fastening method of a channel for guiding a medium or conduits with the help of an adaptable vertical fastening, comprising:

a. a vertical anchor with a fastening end and a threaded connector, b. a threaded pipe with a first inner thread having a first thread direction and with a second inner thread having a second thread direction, the first inner thread and the second inner thread being arranged opposite one another and adjacent to a first and a second pipe opening, the first inner thread of which fits on the threaded connector of the vertical anchor and the first and the second inner thread of which are arranged by a receiving space at a distance to each other, wherein the first thread direction and the second thread direction are the same thread direction, c. a retaining bolt with a free thread end and a head end, the thread end of which fits into the second inner thread of the threaded pipe and the head end of which is connectable or connected with a holding construction of the channel, wherein the fastening method comprises:

S1. fastening the vertical anchor with the fastening end in a supporting horizontal construction, S2. connecting by rotation in a rotation direction the threaded connector of the vertical anchor with the first inner thread of the threaded pipe, S3. screwing-in the free thread end of the retaining bolt into the second inner thread of the threaded pipe in the rotation direction so that the holding construction of the channel is connected with the vertical anchor by the threaded pipe, wherein the fastening method further comprises:

providing the threaded pipe as a pipe with an inner thread end having the first inner thread and a free pipe end, cutting to length of the threaded pipe at the free pipe end to a defined length and providing the second inner thread in the free pipe end opposite to the first inner thread end.

2. The fastening method according to claim 1 further comprising:

S4. decreasing or increasing a vertical distance between the holding construction and the carrying horizontal construction by screwing-in or unscrewing the thread end of the retaining bolt and/or the threaded connector of the vertical anchor into or out from the receiving space of the threaded pipe.

3. The fastening method according to claim 1 further comprising:

pressing-in a thread insert into the free pipe end or fastening a blind rivet nut in the free pipe end or cutting an inner thread and inserting a wire thread insert in the inner thread in the free pipe end or inserting a wire thread insert into a present inner thread.

4. The fastening method according to claim 1, in which the vertical anchor is a. a hanger bolt which is screwed into the horizontal construction, or b. a pop rivet which is driven into the horizontal construction, or c. a heavy-duty anchor which is fastened in the horizontal construction, or d. a threaded rod, having a dowel end, the rod being screwed into the horizontal construction.

* * * * *